United States Patent [19]

Rossi et al.

[11] 4,237,746
[45] Dec. 9, 1980

[54] DRIVE ARRANGEMENT FOR SETTING MECHANICAL APPARATUS, ESPECIALLY THERMOSTATS

[75] Inventors: Guglielmo Rossi, Linkenheim, Fed. Rep. of Germany; Vincenzo Ferloni, Castello Lurate Caccivio, Italy

[73] Assignee: Ranco Incorporated, Columbus, Ohio

[21] Appl. No.: 922,295

[22] Filed: Jul. 6, 1978

[30] Foreign Application Priority Data

Jul. 6, 1977 [DE] Fed. Rep. of Germany ....... 2730475

[51] Int. Cl.³ .............................................. G05G 1/10
[52] U.S. Cl. ...................................... 74/504; 74/10.6; 74/553
[58] Field of Search ...................... 74/553, 504, 568 R, 74/568 T, 567, 10.6, 10.15, 10 R

[56] References Cited

U.S. PATENT DOCUMENTS

| | | | |
|---|---|---|---|
| 1,435,586 | 11/1922 | Collette | 85/9 R UX |
| 1,448,873 | 3/1923 | Searles | 85/9 R X |
| 2,115,284 | 4/1938 | Pratt | 74/504 X |
| 2,536,409 | 1/1951 | Altmann et al. | 74/10.6 |
| 2,836,989 | 6/1958 | Schultz | 74/504 |
| 2,861,466 | 11/1958 | Brock | 74/504 |
| 2,999,991 | 9/1961 | Bender | 74/10 X |
| 3,209,806 | 10/1965 | Currier et al. | 151/69 |
| 3,285,095 | 11/1966 | Rockola | 74/568 |
| 3,385,116 | 5/1968 | Carlson et al. | 74/504 UX |
| 3,556,570 | 1/1971 | Cosenza | 151/69 X |
| 3,999,442 | 12/1976 | Decker et al. | 74/553 X |

*Primary Examiner*—Ramon S. Britts
*Attorney, Agent, or Firm*—Watts, Hoffmann, Fisher & Heinke Co.

[57] ABSTRACT

A mechanism for setting a thermostat having a housing wall forming a mounting opening. A rotatable setting shaft projects through the mounting opening and defines a circumferential groove concentric with respect to the shaft axis and a cam is fixed to the shaft for rotation therewith relative to the housing wall. The cam has a bore with at least one slot at a predetermined angular location and the shaft is locked to the cam by expanding the shaft into engagement with the bore and slot.

The shaft is journaled in a bearing for rotation relative to the housing wall. The bearing comprises at least a collar-like structure fixed with respect to the housing wall and extending axially relative to the shaft and radially inwardly deformed toward engagement with the shaft groove. The collar-like bearing structure and shaft groove cooperate to enable rotation of the shaft relative to the collar-like structure about the axis and to restrain the shaft against axial movement relative to the housing wall. In one embodiment the bearing is integral with the housing while in another embodiment the bearing is formed by an externally threaded tubular member.

9 Claims, 6 Drawing Figures

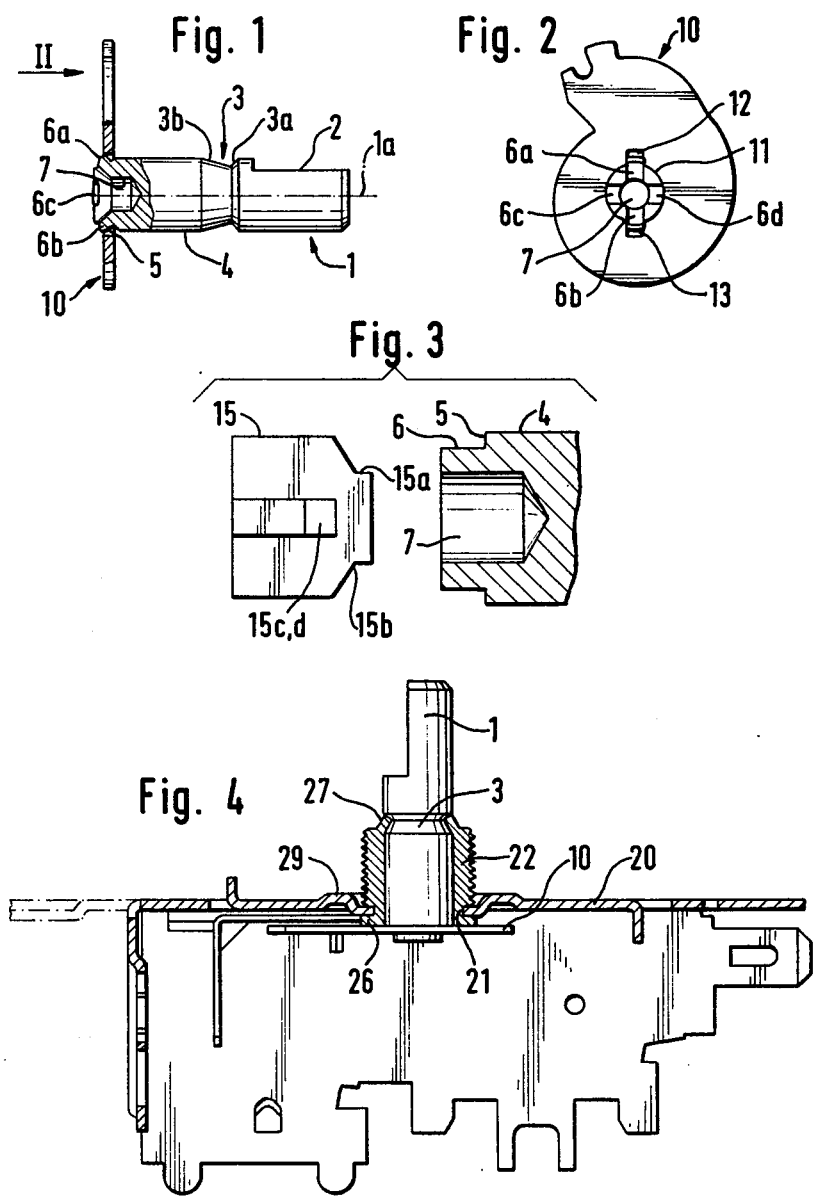

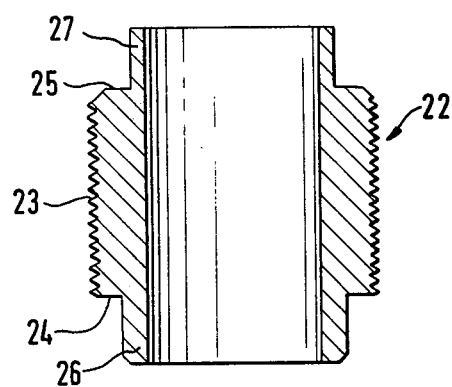
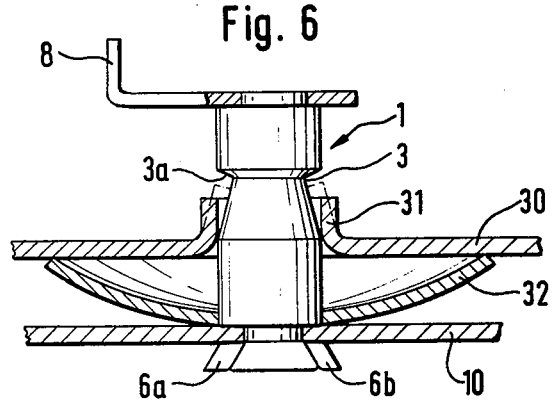

DRIVE ARRANGEMENT FOR SETTING MECHANICAL APPARATUS, ESPECIALLY THERMOSTATS

The invention relates to a drive arrangement for setting (adjusting) mechanical apparatus, f.i. regulating apparatus, especially thermostats, comprising a device body or housing having a hole, a shaft bearing, a shaft which is journaled for rotation in the shaft bearing and fixed therein against axial movement and having at least a driving means on its end which is outside of the body, and power transmitting means which are inside and at least a disk-like cam which is again inside of the said body and fixed to the shaft.

The shafts of many kinds of devices sold on the market have flat surfaces at its peripheral area which are used as driving and power transmitting means and, at the same time, define the angular position of the shaft to the cam. When driven by hand, f.i. a knob is fitted onto the extreme end of the shaft which has a D-like cross section in said area.

Usually, at the other end of the shaft, there is a second D-shaped portion or one having two parallel sides, in order to fix the cam in its proper angular position. The shaft normally is journaled within a bush which has a flange and a thread used as a fixing means of the device to a panel, the flange and a nut clamping the panel around a hole. The one end of the bush abuts the disk-like cam and the other end abuts a spring ring which engages into a groove of the shaft such that the axial position of the shaft is defined. The described structure has the disadvantage for the elevated price to produce it, due to the machining required for producing the bush and the shaft, therefore, to lower the machining costs, these parts usually are made from brass or aluminum though the material price is much higher than that of steel. There is a further disadvantage in that the angular position of the knob to the cam cannot be changed due to the angular positions of the D-shaped cross sections with the consequence that a new shaft is to be designed and produced whenever an angularly changed arrangement is desired.

It is an object of this invention to produce an improved drive device of the initially described type in such a way that, without changing the shaft, an arbitrary angular alignment of shaft to the disk-like cam or cams is possible. It is a further object of the invention to provide an improved drive arrangement, the manufacturing costs thereof even being lowered.

The possible solution together with developments and variations may be taken from the claims.

By avoiding shoulders on the parts used, the production price can be lowered in two aspects, namely by minimizing machining time and on the other hand by making use of steel instead of brass or aluminum. The length of the ring-shaped collar is to be chosen according to the number of disk-like cams which are to be fixed onto the shaft. Since the bush has no radial flange, calibrated tubes can be used as blanks. This blank tube additionally can have a thread on its periphery, and the ring-like collars may be produced by cutting down the thread. In the form having two ring-like collars, no spring ring is necessary to fix the axial position of the shaft. Finally, the connection between the disk-like cam and the shaft shows a minimized clearance, and, therefore, extremely precise.

In the following description, two embodiments of the invention are illustrated referring to the drawings, which show:

FIG. 1 a partially cross-sectional view through a shaft and a disk-like cam connected thereto;

FIG. 2 a view according to II in FIG. 1;

FIG. 3 an enlarged fragmentary portion of FIG. 1, before being deformed;

FIG. 4 a partially cross-sectional view of the drive device;

FIG. 5 an enlarged fragmentary cross-sectional view; and

FIG. 6 a second embodiment of the drive device.

A shaft 1 made of steel has a flat surface 2 at its periphery such that at this area a D-shaped cross section portion is created to the purpose of fitting in a certain angular relation a knob or a dial, for example (not shown). Around the periphery of the shaft 1 there is a groove 3, the slopes 3a and 3b of which have an angle of about 90 degrees, the slope 3a having an angle of about 60 degrees to the axis 1a of the shaft. Between the groove 3 and the left end of the shaft 1 (FIG. 1), a cylindrical portion 4 extends which terminates in a shoulder 5, where a ring-like collar 6 extends from, obtained by machining the outer surface and drilling a hole 7. The collar 6 originally (FIG. 3) is cylindrically shaped and, when the shaft has a diameter of 6 mm, the outer diameter of the collar is 4.8 mm and the inner diameter 3 mm, whereas the length is 1.6 mm or 2.4 mm dependent on the circumstances whether one or two cams 10 made of steel are to be fixed. In any case, the material of the cam 10 is harder than that of the shaft 1. The protruding length of the collar is 0.8 mm in the example described. When being finally assembled, the collar 6 is deformed at areas 6a, 6b, 6c, 6d. In order to take up the collar 6 the cam 10 has a circular hole 11 from which two slots 12, 13 extend which are aligned to one another and are arranged in a desired angular position to the outer cam profile. In the example given, the slot is 1.6 mm wide and the end surfaces have a distance of 7 mm from one another.

Shaft 1 with its flat surface 2 is angularly aligned to the cam slots 12, 13 within an assembling tool (not shown), and a ram 15 (FIG. 3) enters into the hole 7 of the ring-like collar 6. Ramps 15b are arranged in a certain distance from the leading end 15a of ram 15 which, at this area, has a rectangular cross section corresponding essentially to the form of the slots 12, 13. Further ramps 15c, 15d extend from the sides of ram 15 which takes a cross-like section, the limbs due to the ramps 15c being shorter than the limbs formed by the ramps 15b. Since the material of the shaft 1 is softer than that of the cam 10, the borders of the slots 12, 13 may be used as a die when deforming the collar 6. It is arranged that the ram 15 hits the border of the collar 6 in a proper angular alignment to the slots 12, 13, and the collar 6 is deformed and expanded into the slots 12, 13 resulting in a tight connection between shaft 1 and cam 10. The ramps 15c effect another deformation of the border of the collar 6 such that any clearance between collar 6 and hole 11 will disappear. The deformations 6a, 6b are tab-like as the collar has been broken by the slot-like die 12, 12; the deformations 6c, 6d appear only as marks on the collar.

In order to provide a shaft bearing and to fix it to a body member 20 (FIG. 4), there is provided a bush 22, which is to be seen in FIG. 5 in its details. The bush 22 has no radial flange, but a cylindric portion 23 limited by shoulders 24, 25. The cylindric portion 23 is of greatest diameter and threaded. On a reduced diameter, there are a relatively stronger collar 26 extending beyond the shoulder 24 and a relatively thinner collar 27 extending beyond the shoulder 25. In this way it has been made sure that the surface of shoulder 25 is large enough to take up the deforming pressure for the collar 26. In the embodiment to be described, the bush 22 has an inner diameter of 6 mm, the collar 26 an outer diameter of 7.6 mm and, therefore, a wall thickness of 0.8 mm, whereas the collar 27 has an outer diameter of 6.9 mm and, therefore, a wall thickness of 0.45 mm. The length of the collar 26 is chosen according to the wall thickness of the body member 20, and the length should exceed this wall thickness by 1.4 mm. The length of collar 27 corresponds to the length of slope 3b of the groove 3.

The body member 20 has a recess 21 having a toothed rim, the diameter of which corresponds to the outer diameter of the colar 26. The bush 22 is introduced into a holding device (not shown) where the shoulder 25 abuts, whereupon the body member 20 with its toothed recess 21 is fitted onto the collar 26 which, thereupon, is deformed flange-like by a press (not shown), that is the collar 26 is riveted as shown in FIG. 4. The shoulder 25 is large enough to support and transmit, without being deformed, the pressure occurring during the deforming of collar 26. The toothed rim of recess 21 is used as a support with the result that the teeth are filled by the material of the collar 26, and a connection having a good torsional strength is created. In order to better define the mounting surface, a stiffening corrugation 29 may be formed around the recess 21.

The shaft 1 and the cam 10 being fixed thereon are mounted into the bush 22, and the axial position of the shaft 1 is made sure by deforming inwardly the collar 27 into the groove 3. This may be done by a punch engaging the collar 27 on four points or by a hollow ram having a conical deforming surface. As may be seen from FIG. 4, pulling onto shaft 1 brings cam 10 to engage the collar 26 (which is deformed) and pushing the shaft 1 causes abutting the slope 3a at collar 27 which is engaged in a direction to narrow the clearances therebetween. The connection therefore is extremely made sure.

After having completely assembled the module, it can be fixed to the wall of a composite apparatus or to a panel by using a nut which will be screwed on the thread 23. The wall or the panel (not shown) engages the mounting surface of the corrugation 29 and is clamped by the nut.

It is also possible to butt weld the bush 22 to the body member 20 (instead of riveting), the collar 26 being omitted in this case.

FIG. 6 shows an embodiment where no fixing of the module to the wall or panel is provided in the manner as described, such that the bush 22 with its thread 23 is abolished. The shaft 1 and the cam 10 are fixed one another, however, there is a so-called "driver" 8. The frame member 30 has a recess 31 which is formed as a cylindrical projection and is inwardly deformed to engage the groove 3. In this way, a shaft bearing is formed. Between the cam 10 and frame member 30, a spring washer is provided which is pressing the deformed border of recess 31 against the slope 3a of groove 3 and, in this way, is fixing shaft 1 axially. The structure of this embodiment is especially simple, however, due to the bias of spring washer 32, is a little hard to rotate.

As a variant to the embodiments, the shaft 1 may also be axially fixed by a spring ring, the bush 22 being without collar 27 or the recess (FIG. 6) being a cylindrical hole, as the case may be.

When deviating from the dimensioning of the examples, the proportions have to be chosen having in mind that the wall thicknesses of the collars 26, 27 and the dimensions of the shoulders 24, 25 be appropriate for the purpose intended. In any case, an expert, without departing from the spirit of the invention, may use proper values within certain limits after having changed the proportions.

Furthermore, it is not necessary that two slots 12, 13 be used, since only one or even more than two could be provided.

We claim:

1. A drive arrangement for setting mechanical apparatus such as a thermostat comprising:
   (a) an apparatus body member defining a mounting opening;
   (b) a bearing fixed with respect to the body member;
   (c) a shaft journaled in the bearing for rotation relative to the body member, said shaft comprising:
      (i) one end disposed outwardly of the body member for carrying at least a setting means;
      (ii) an opposite end disposed within the body member; and,
      (iii) power transmitting means at said opposite end formed by a shoulder on the shaft and a collar projecting from the shoulder; and,
   (d) cam means disposed within the body member and fixed to said opposite shaft end by said power transmitting means, said cam means comprising a cam member defining a cam profile and having a bore with at least one slot opening to the bore at a predetermined angular position with respect to the cam profile, the cam member being constructed from material which is harder than the shaft material so that said bore and slot form a die;
   (e) said shaft collar projecting axially through the cam member bore and protruding beyond said cam member, the projecting end of the collar being expanded into engagement with the cam member bore and slot.

2. The drive arrangement claimed in claim 1 wherein two diametrically opposed slots are formed in said cam bore.

3. The drive arrangement claimed in claim 1 wherein said collar is expanded toward engagement with said cam bore at locations spaced from the slots.

4. The drive arrangement claimed in claim 1 wherein said one shaft end is provided with connecting structure for mounting a setting means, said structure having a predetermined angular relationship to said cam when said collar is expanded to engage said cam bore.

5. The drive arrangement claimed in claim 1 wherein said shaft is generally cylindrical and has a peripheral groove formed therein, said bearing comprising a collar-like structure surrounding said shaft and extending into said groove, said collar-like structure enabling rotation of said shaft relative thereto while resisting relative axial movement of the shaft relative to the bearing.

6. A mechanism for setting a device such as a thermostat defined in part by a housing wall having a mounting opening, the mechanism comprising:
   (a) a setting shaft rotatable about an axis projecting through said mounting opening and defining a circumferential groove concentric with respect to said axis;

(b) a cam means fixed to said shaft for rotation therewith relative to said housing wall; and, (c) a bearing in which said shaft is journaled for rotation relative to said housing wall, said bearing comprising at least a collar-like structure fixed with respect to said housing wall and extending axially relative to said shaft and radially inwardly deformed toward engagement with said shaft groove, said collar-like bearing structure and shaft groove cooperating to enable rotation of the shaft relative to the collar-like structure about said axis and to restrain said shaft against axial movement relative to said housing wall.

7. The mechanism claimed in claim 6 wherein said bearing further comprises a tubular externally threaded body surrounding said shaft, said collar-like structure projecting from an axial end of said threaded body.

8. The mechanism claimed in claim 6 wherein said collar-like structure is formed integrally with said housing wall and projects therefrom about said mounting opening.

9. A mechanism for setting a device such as a thermostat defined in part by a housing wall having a mounting opening, the mechanism comprising:
a control shaft extending through said mounting opening and having a cylindrical portion, a groove extending about the shaft adjacent the cylindrical portion, an end portion projecting outwardly from the housing wall and defining a noncircular portion for driving engagement with a setting element; a cam-like element nonrotatably attached to the shaft; and, a bearing between the housing wall and the shaft, said bearing including a cylindrical body having an internal face closely surrounding said cylindrical shaft portion and an external face defining a screw thread by which the device is mounted, said cylindrical bearing body terminating in axially spaced radially inwardly extending surfaces and first and second reduced diameter collars projecting axially from said surfaces, said first collar being radially outwardly deformed and engaging the housing wall about the mounting opening to clamp the housing wall against the adjacent cylindrical body surface and thereby secure the bearing and shaft to the housing, said second collar being radially inwardly deformed and extending into said shaft groove to position the shaft axially relative to the bearing while permitting relative rotation therebetween.

* * * * *